July 20, 1965  G. A. NAAB  3,196,276
ARTICLE DELIVERY CHUTE WITH PHOTOSENSITIVE
MEANS TO PREVENT STUFFING
Filed April 19, 1962  3 Sheets-Sheet 1

INVENTOR.
GERARD A. NAAB
BY
AGENT

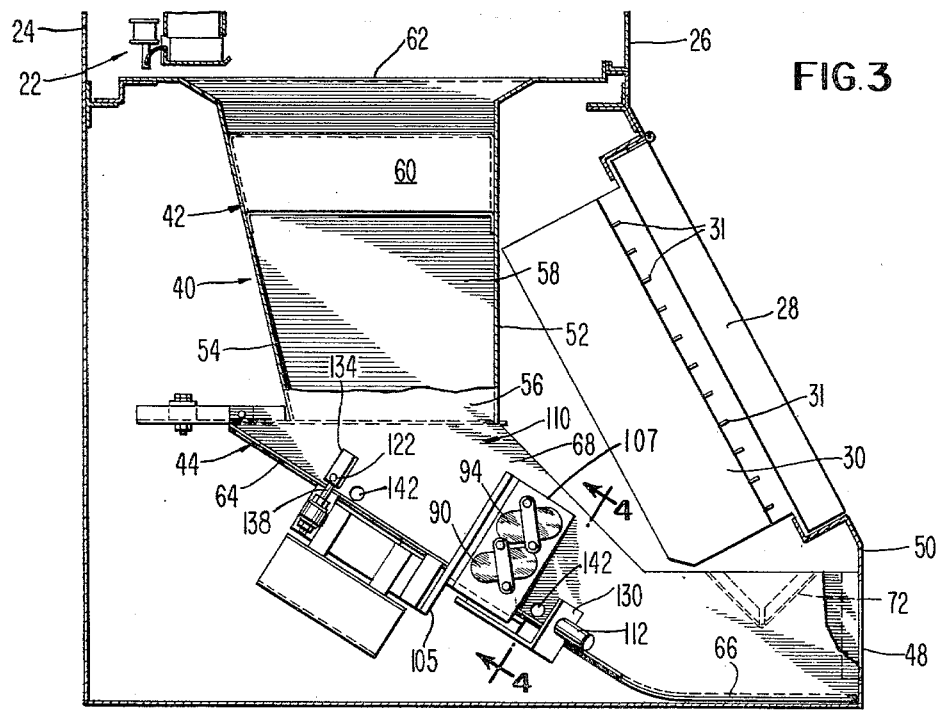

July 20, 1965

G. A. NAAB 3,196,276

ARTICLE DELIVERY CHUTE WITH PHOTOSENSITIVE
MEANS TO PREVENT STUFFING

Filed April 19, 1962

United States Patent Office 3,196,276
Patented July 20, 1965

3,196,276
ARTICLE DELIVERY CHUTE WITH PHOTOSENSITIVE MEANS TO PREVENT STUFFING
Gerard A. Naab, Morton, Pa., assignor to Brewer Pharmacal Engineering Corporation, Upper Darby, Pa., a corporation of Pennsylvania
Filed Apr. 19, 1962, Ser. No. 188,679
4 Claims. (Cl. 250—223)

The invention hereinafter described and claimed relates to chutes. More specifically however, it has to do with chutes for article storage and issuing apparatus wherein the chute is adapted to receive articles at one point and deliver them to another, and simultaneously therewith actuate associated apparatus. While of broader applicability the invention is particularly adapted for use in equipment such as shown and described in the co-pending application entitled "Inventory Control System and Apparatus" Serial No. 162,630, filed December 12, 1961 in the names of Frederic T. C. Brewer, William A. White, and Walter E. Colburn, and assigned to the assignee of the present invention.

The apparatus of this previously filed application is cyclically operable to issue or deliver a pre-selected of a plurality of different articles from a locked storage area in a cabinet to a point of access from the exterior thereof. Passage of the article into or through the chute actuates a sensing circuit thus to initiate operation of a recording device to make a record of the article delivery.

Unfortunately chutes of this type are subject to "stuffing." That is, blocking of the chute with a foreign object such as wadded paper or cloth inserted above the sensing means before initiating a cycle of operation thus to prevent the record being made, then, after the cycle is completed, removing the stuffing and appropriating—or stealing—the article.

It is the primary object of the present invention to provide improved chute apparatus.

It is an important object of the invention to provide improved chute construction capable of sensing the passage therethrough of articles and thereby initiate operation of associated apparatus.

It is also an object to provide such a chute construction particularly adapted for use in article storing and issuing apparatus in a manner over-coming the "stuffing" problem.

In accordance with the above objects and first briefly described the invention comprises an article delivery chute for article handling apparatus, and having separated article receiving and delivery openings whereby an article entering the receiving opening will pass through the chute to the delivery opening. Between the openings, the chute is provided with means for sensing the passage of the article through the chute and responsive thereto to effect actuation of associated apparatus, such as a recorder. In the chute between the receiving opening and the sensing means, means is provided to detect stuffing of the chute thus to prevent actuation of the issuing apparatus and thereby foil illicit operation of the apparatus.

Other objects and features of the invention will become apparent from the following description of the preferred embodiment of the invention when taken with the various figures of the drawings, in which:

FIG. 3 is a sectional view taken along the line 3—3 of FIG. 2;

FIG. 4 is a sectional view taken along line 4—4 of FIG. 3;

FIG. 5 is a fragmentary view showing a detail of the article sensing means;

Figure 7:
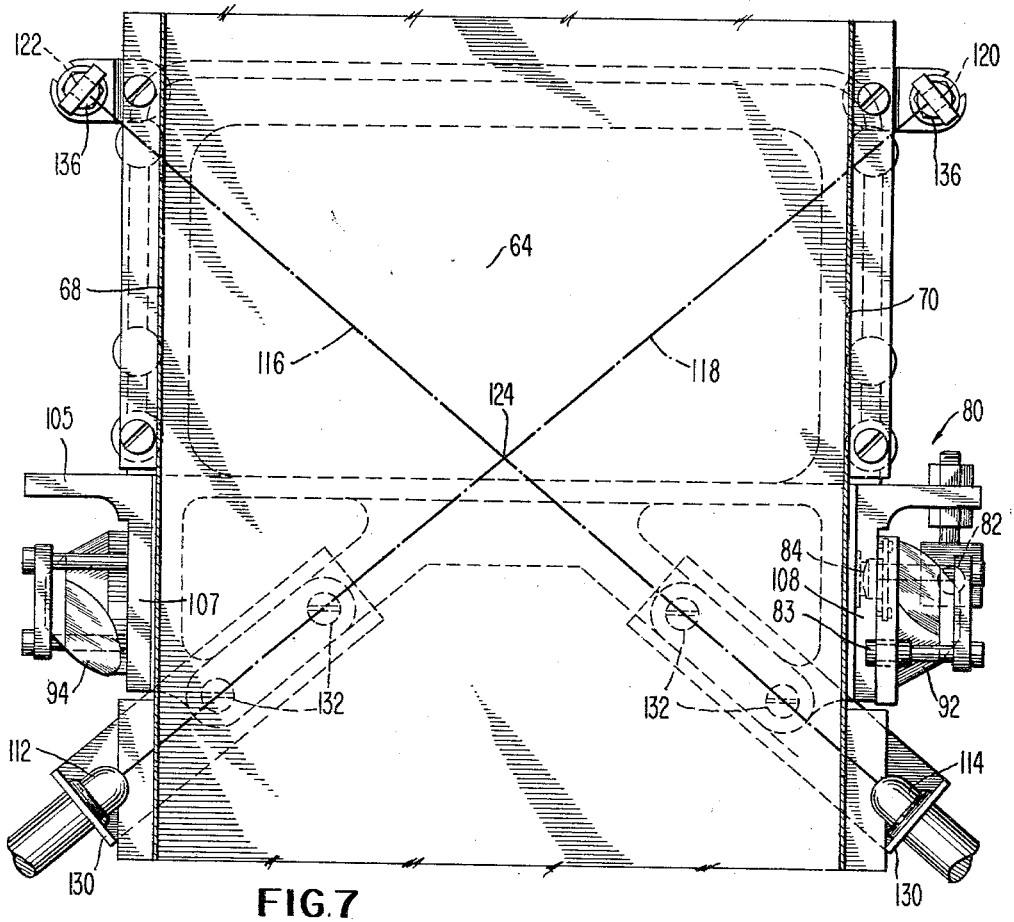
Figure 8:
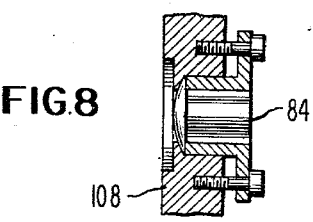

FIG. 6 also is a fragmentary view showing another detail of the article sensing means;

FIG. 7 is a fragmentary plan view of the chute and showing the article sensing and anti-stuffing means;

FIGS. 8 and 9 show details of the optical system of the sensing means; and

Figure 10:
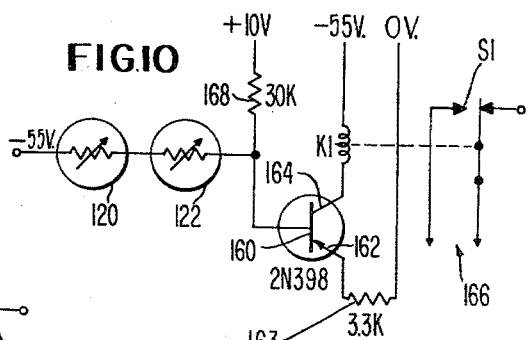
Figure 11:
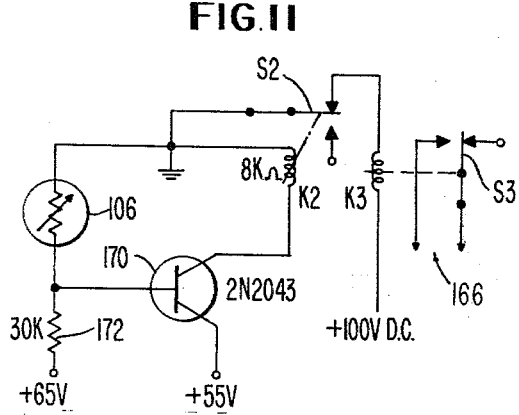

FIGS. 10 and 11 are schematics of the control circuits.

Figure 1:
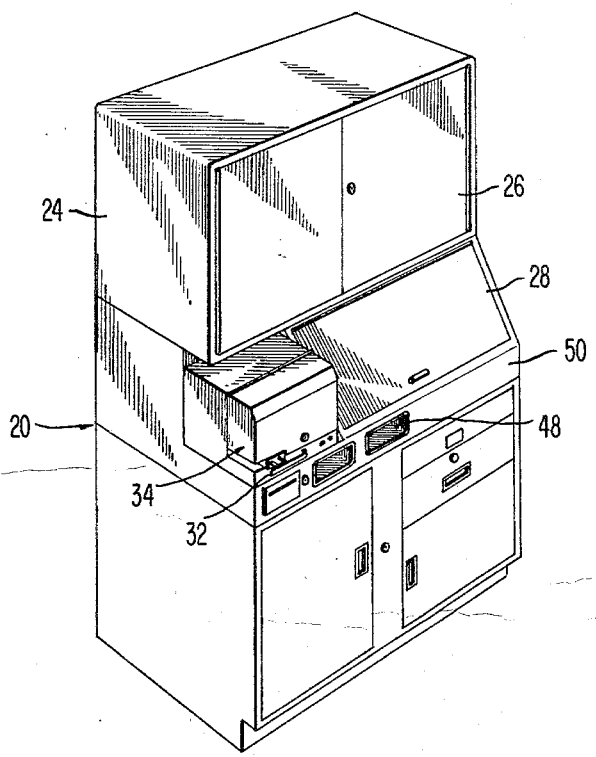
FIG. 1 is a perspective view of article issuing apparatus according to the above identified co-pending application and in which is incorporated an article delivery chute according to the present invention.
Figure 2:
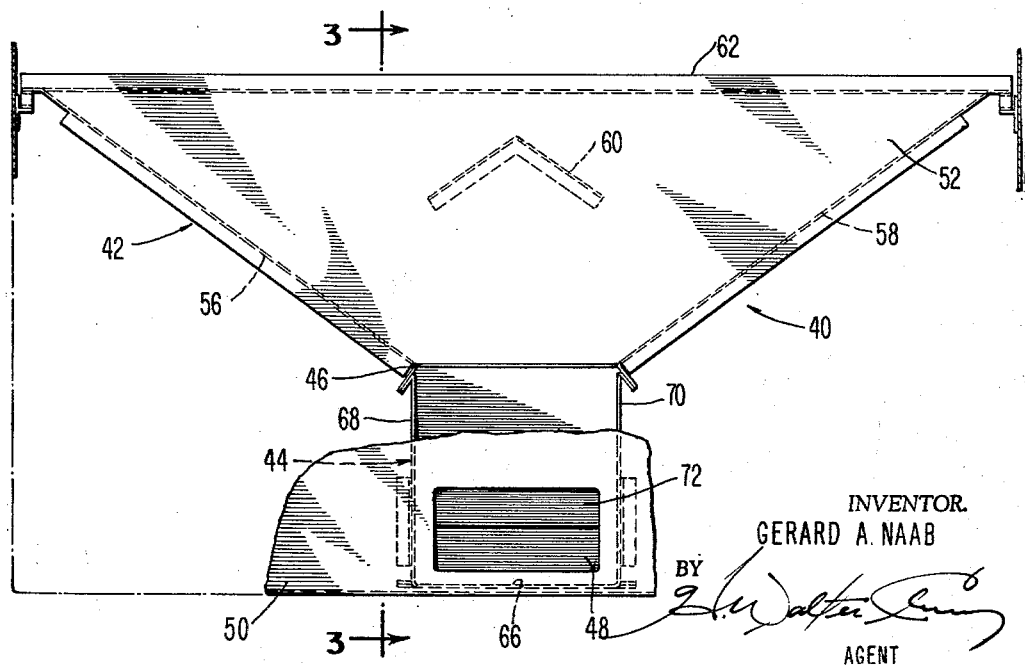
FIG. 2 is a fragmentary front elevational view of the apparatus of FIG. 1 with parts broken away more clearly to show the chute.

With reference to the details of the drawings and particularly to FIGS. 1, 2, and 3 it is seen that the invention is incorporated in an article storing and issuing machine 20, such as disclosed in the above identified co-pending application of Brewer et al. In that invention a plurality of article holding and ejecting bins 22, only one of which is shown in FIG. 3, are positioned in the upper portion 24 of the cabinet behind locked doors 26. While these bins may be of other convenient construction, it is preferred to provide them in accordance with those shown and described in the co-pending application of Richard I. Kester, entitled Article Storing and Issuing Apparatus, Serial No. 187,636 filed April 16, 1962, now abandoned and assigned to the assignee of the present invention. To obtain issuance of a particular article the door 28 is opened exposing to the operator the drug selector console 30 housing key plates 31 corresponding to and identifying each of the articles stored in the cabinet. As described in the aforesaid Brewer et al application a particular bin is selected by withdrawal of a corresponding identification plate 31 from the console 30. This plate along with a customer identifying plate and an operator-identifying plate is inserted in the shuttle 32 of a recorder 34. Depression of a start button (not shown) beneath the door 28 and on the console 30, then actuates the selected bin 22 to issue or project an article or package into the article receiving opening of the chute mechanism forming the subject matter of the present invention, and identified generally by the reference character 40 (FIG. 3).

The chute per se is formed in two main sections, an upper section 42 and a lower section 44. The upper section, as seen more clearly in FIG. 2, tapers downwardly and inwardly from a dimension substantially equal to the width of the upper cabinet portion 24 to join with the narrow lower portion 44, as at 46. From this point the chute is of substantially the same width down to the access opening 48 in the front wall 50 of the cabinet 20, as seen in FIG. 1. The upper portion 42 is formed by front and rear walls 52 and 54 respectively, and side walls 56 and 58. While not necessary in some cases, depending upon the weight of the articles in the bins 22, a baffle member 60 may be provided in the upper portion 42 of the chute so that the packages in the bins immediately above the center portion of the chute will be deflected in a circuitous route in falling from the bins to the lower portion 44 of the chute and thereby with less speed, thus to prevent damage to a package falling in this area.

As seen more clearly in FIG. 3, a package or article introduced into the inlet or receiving opening 62 of the chute will fall by gravity through the upper portion 42 to land on the bottom wall 64 of the lower chute portion, and on which it will slide or tumble down to the lowermost portion 66 in position to be removed through the access or delivery opening 48. It will be noted that the lower chute portion 44 is formed by side walls 68 and 70 in cooperation with the sloping bottom wall 64. It is not necessary to provide a top wall for the chute in this application of the invention as this portion is covered by the key plate console 30 and the front wall 50 of the cabinet, as seen in FIG. 3. It should be realized of course that in other applications a top wall may be provided, thus completely enclosing the chute against access except through the opening 48. Extending across the side walls 68 and 70 in the lowermost portion of the lower chute 44 is a V-shaped baffle member 72 which prevents easy access through opening 48 to the upper portions of the lower chute 44 as explained more clearly hereinafter.

According to the particular application of the invention, as shown and described herein—although it is not to be considered so limited—the chute is provided with means for sensing the passage of an article therethrough and incidental thereto initiating operation of the charge recorder 34 to make a record of the transaction, all as more fully described in the above mentioned co-pending application of Brewer et al. The sensing means comprises apparatus 80, having a radiant energy exciter 82 which in this case is a lamp, a photo-resistor 83, and optical means for directing a beam of light from lamp 82 to the photo-resistor. The optical means comprises a lens 84 for projecting a beam of light 86 from the light source to the left, as seen in FIG. 4, across the width of the lower chute portion 44 in a path, preferably parallel to the bottom wall 64 of the chute and at a height thereabove less than the minimum major dimension of an article package in the bins 22, thereby making it impossible for an article to slide on the bottom wall 64 through the sensing means without intercepting the beam 86. In order to prevent a package from hurtling or bouncing over the beam 86 without being detected, means is provided to pass the beam back and forth across the chute, preferably in parallel paths vertically displaced from the path 86 in equal increments less than the minimum major dimension of any package issued from the bins. The means provided for this purpose is a series of prisms 90, 92 and 94.

The beam of light 86 from the light source 82 first strikes the lower reflecting surface 96 of the prism 90 from which it is reflected to the upper surface 98 which reflects it across the chute in the path indicated by the reference character 100, to be similarly reflected by the corresponding reflective surfaces of prism 92 back across the chute in path 102 to prism 94 which reflects it upwardly and transversely across the chute in path 104 to be received by the photo-resistor unit 83. Each successive path of the beam across the chute is above the preceding path a distance less than the minimum major dimension of the package, as described above in connection with beam paths 86 and 100.

The uppermost beam path 104 is adjacent the top of the chute at a height making it impossible for a package to pass through the chute without intercepting one of the light beams thus to effect actuation of the associated apparatus, such as the recorder 34, as described below. The photo-resistor, the prisms and the light source are all supported on a unitary casting 105, as more clearly defined in FIGS. 4 and 7. The casting comprises the base portion 106 extending across bottom wall 64 of the chute, and vertical walls 107 and 108, to which the prisms and other optical elements are attached.

As mentioned before, chutes of this kind are subject to stuffing, that is, some foreign object, such as a wad of paper or cloth, may be inserted through the access opening 48 and upwardly through the chute past the light beam paths described above and into the area 110 (FIG. 3) thus to intercept a package prior to its passing through the beams and hold it in this area until a cycle of the machine is completed, after which the stuffing is removed along with the package thus to appropriate a package without a record of the transaction being made by the recorder.

The present invention provides additional means to prevent such stuffing. This means comprises a pair of ray energy sources, such as light bulbs 112 and 114 (FIG. 7) arranged to project their beams in angularly upwardly extending paths 116 and 118 and across the bottom wall 64 of the chute to associated ray sensitive devices 120 and 122, such as photo-resistors, the beams crossing each other at 124. As seen in FIG. 4, these beams of light traverse the chute quite close to the bottom wall and beneath path 86 of the article-sensing beam. By directing these light beams in the angular paths, a greater area of the chute is traversed by the beams than if they were directed straight across thereby affording a greater degree of protection against stuffing of the chute. It is realized, of course, that these beams do not cover every minute portion of the chute above the article sensing beam paths, however, the present arrangement affords coverage of such a large area and in such directions as to make it extremely difficult for anyone to insert anything in the chute to stuff it in such a way as to prevent a package or the stuffing itself intercepting the sensing beams 86, etc.

The anti-stuffing apparatus is also carried by the casting 105 thus making the apparatus a unitary sub-assembly facilitating the manufacture and assembly thereof with the chute. As seen in FIG. 7, the light bulbs 112 and 114 are carried on angle-shaped supporting brackets 130 adjustably secured to the casting 105 as by screws 132 extending through slots (not shown) in the brackets, while the photo-resistors 120 and 122, as seen in FIG. 6, are each carried by a standard 134 secured to casting 105 by nuts 136 threaded over the shank 138 of the standard. Adjustment of the photo-resistors relative to the casting is easily attained by changing the position of nuts 136 on the standard 138. Binding posts 140 are also mounted on the standards 134 to provide means for inter-connecting the photo-resistors in the circuit, as described below. The side walls 68 and 70 of the chute, as seen in FIG. 3, are provided with apertures 142 through which the light beams pass in crossing the chute.

While prisms have been employed in the present form of the invention because of their stability and ease of assembly, it will be understood of course, that plain mirrors or other suitable means for turning the light beam may be employed as desired. In this form of the invention the prisms are attached to the vertical walls of casting 108 in recesses 144 (see FIG. 9) in the outer face 146 of the walls. Means for attaching the prisms into the recesses in the illustrated form of the invention is provided by a pair of threaded studs 150 on each side of each prism and a cross-bar 152 bearing against the apex 154 of the prism with sufficient pressure to hold the prism tightly on the walls of the casting, as by the nuts 156.

Circuit means for controlling operation of associated apparatus such as the drug issuing mechanism and the recorder in the inventory control system of the above identified co-pending Brewer et al. application, may be as shown in FIGS. 10 and 11—the details of which are described below—or other as desired.

Referring now to FIG. 10 it is seen that the anti-jam portion of the circuit comprises the photo-resistors 120 and 122 connected in series to the base of a transistor 160, the electrodes 162 and 164 of which are both connected to voltages more negative than the base of the transistor through a resistor 163 and a relay K1, respectively. The relay is operatively connected to a normally open switch S1 in the power supply to the operative circuit 166 of the article issuing apparatus and to the recorder, or other associated apparatus to be controlled. A resistor 168 is connected to the photo-resistors 120 and 122 and to the base of transistor 160.

In operation under normal conditions—that is, with no foreign object in the chute to prevent an ejected article from passing completely through the chute to the article delivery opening 48—light from lamps 112 and 114 impinges upon photo-resistors 120 and 122 dropping their combined resistance to a maximum of 100K ohms, and the current through the photo-resistors to the low impedence side of the transistor is 0.5 ma. However the 30K ohm resistor 168 will bleed off or subtract 0.33 ma. leaving only 0.17 ma. to reach the transistor. This latter current (0.17 ma.) multiplied by the amplification factor of the transistor (a minimum of 40) gives a current of 6.8 ma. which is sufficient to energize relay K1 to maintain switch S1 in closed condition whereby the associated apparatus may be operated, for example, by the closing of switch S3 shown in FIG. 11, and as described hereinafter.

Now, if light from either or both of the lamps 112 and 114 is prevented from impinging upon its companion photo-resistors 120 and 122 for a sufficient length of time, their total series resistance becomes greater than 500K ohms and the current through them, by reason of the current through resistor 168 and the leakage current through the transistor, becomes less than 0.1 ma. The base of the transistor thus becomes positive cutting off the current to the relay which opens switch S1 to cut out the power supply and thus prevent operation of the associated apparatus.

The article sensing portion of the circuit shown in FIG. 11 comprises the photo-resistor 83 in series circuit with transistor 170 and relay K2, with a resistor 172 in parallel with the transistor, and a second relay K3 in parallel with relay K2 controlled by switch S2 of relay K2. Switch S3 in circuit 166 is operatively connected to relay K3 and, as mentioned above, cooperates with switch S1 (FIG. 10) to close the circuit 166 to permit operation of the associated equipment.

In operation under normal conditions (no stuffing of the chute as described above) light from lamp 82 traverses the chute back and forth (FIG. 4) to impinge upon photo-resistor 83 causing its resistance to drop to a maximum of 62K ohms. This tries to drive 900 $\mu$a. through the emitter base of the transistor 170. However the resistor 172 robs it of 330 $\mu$a. leaving only 570 $\mu$a. which multiplied by the D.C. current gain of the transistor provides a minimum of two milliamps through relay K2 to energize it and thus deenergize relay K3 by opening switch S2.

If the light beam is broken, as by an article from bins 22 passing through it, the photo-resistor 83 is darkened and its resistance rises to 400K ohms. This permits 140 $\mu$a. to balance the 330 $\mu$a. from the 30K ohm resistor 172, back biasing the transistor 170 causing the relay K2 to become de-energized closing switch S2 energizing relay K3 to close switch S3 in circuit 166 to the recorder. Other means, not important here, are used to hold the circuit closed for one cycle of operation of the recorder and then shut it off. Reference may be had to the above-identified copending application for such details. Relay K1 is slow acting, therefore an article passing through the beams 116 and 118 will have no effect on the normal operation of the apparatus.

Having now described the preferred form of the invention it is clear that it provides an article handling chute having the attributes set forth at the beginning of this specification.

What is claimed is:

1. An article handling chute for use in an electrically operable article storing and issuing apparatus, comprising:
 (A) walls forming an unobstructed article delivery chute whereby articles can enter one end and under normal conditions of operation pass therethrough undeterred, said chute having
   (a) an article receiving opening for receiving articles from said issuing apparatus, and
   (b) an article delivery opening spaced from receiving opening and to which articles from said issuing apparatus are guided by said chute;
 (B) a first article sensing means in said chute between said receiving and delivery openings and comprising,
   (a) a source of radiant energy
   (b) means for directing said radiant energy in a beam traversing the interior of said chute in plural paths for sensing an article as it passes through said chute, said plural paths of said beam being separated by less than the smallest major dimension of the article passing therethrough whereby the article cannot pass through said chute without intercepting the beam
   (c) means to receive said radiant energy,
   (d) a first switch, and
   (e) first circuit means in circuit with the means to receive said radiant energy operative to move said first switch to one condition in response to receipt of said radiant energy by said receiving means, and operative to move said switch to another condition in response to fluctuation in said radiant energy whereby control of associated apparatus can be effected;
 (C) a second article sensing means on said chute between said receiving opening and said first article sensing means to detect foreign matter in said chute between said first article sensing means and said receiving opening which could prevent an article from passing through said first article sensing means after being issued by the issuing apparatus, said second article sensing means comprising,
   (a) means forming at least one beam of radiant energy directed across said chute from one side to another,
   (b) means to receive each said beam of radiant energy,
   (c) a second switch, and
   (d) second circuit means in circuit with each of the means to receive each said beam of radiant energy operative to move said second switch to one condition in response to receipt of said radiant energy by said receiving means and operative to move said second switch to another condition in response to a predetermined interruption of said beam whereby operation of the issuing apparatus may be prevented.

2. Apparatus according to claim 1 wherein said second article sensing means comprises a pair of light beams and receivers, with said beams traversing said chute close to the bottom wall thereof and crossing each other in the area between the said first article sensing means and said receiving opening.

3. Apparatus in accordance with claim 2, and further including,
 (A) means supporting said first and second article sensing means on the exterior of said chute walls, and wherein
 (B) said chute walls are provided with apertures through which said beams pass to traverse the interior of the chute.

4. An article handling chute for use in electrically controlled cyclically operable article storing and issuing apparatus, comprising:
 (A) walls forming said article handling chute with,
   (a) an article receiving opening for receiving articles from the issuing apparatus,
   (b) an article delivery opening spaced from said receiving opening and to which articles from the issuing apparatus are guided by said chute,
   (c) said chute being open and unobstructed between said receiving and delivery openings;
 (B) photo sensitive article sensing means in said chute between said receiving and delivery openings for sensing an article as it passes through said open chute;

(C) a first switch
(D) first circuit means in circuit with said article sensing means responsive to such sensing to effect operation of said switch whereby control of associated apparatus may be effected;
(E) photo sensitive object sensing means between said receiving opening and said article sensing means to detect foreign objects in said chute between said article sensing means and said receiving opening;
(F) a second switch; and
(G) second circuit means in circuit with said object sensing means operative upon sensing of a foreign object in said chute to effect operation of said switch whereby operation of said issuing apparatus may be prevented.

References Cited by the Examiner

UNITED STATES PATENTS

| | | |
|---|---|---|
| 1,887,576 | 11/32 | Bollinger. |
| 1,977,884 | 10/34 | Long _____ 194—97 |
| 2,029,113 | 1/36 | Mills. |
| 2,237,132 | 4/41 | Christensen _____ 250—223 X |
| 2,441,519 | 5/48 | Terhune _____ 221—13 |
| 2,571,576 | 10/51 | Hopkins et al. _____ 250—223 |
| 2,782,577 | 2/57 | Beall _____ 221—12 X |
| 2,949,993 | 8/60 | Adler _____ 221—12 X |
| 3,001,669 | 9/61 | Tandler et al. _____ 221—12 |
| 3,033,418 | 5/62 | Hollopetre _____ 221—13 |

RALPH G. NILSON, *Primary Examiner.*

KENNETH N. LEIMER, *Examiner.*